United States Patent
Sandler et al.

(10) Patent No.: US 10,899,124 B2
(45) Date of Patent: Jan. 26, 2021

(54) TO DETERMINE A QUANTITY OF A LIQUID IN A CHAMBER

(71) Applicant: HP INDIGO B.V., Amstelveen (NL)

(72) Inventors: Mark Sandler, Rehovot (IL); Peter Nedelin, Ashdod (IL); Yaron Peri, Nes Ziona (IL)

(73) Assignee: HP Indigo B.V., Amstelveen (NL)

( * ) Notice: Subject to any disclaimer, the term of this patent is extended or adjusted under 35 U.S.C. 154(b) by 409 days.

(21) Appl. No.: 14/905,074

(22) PCT Filed: Jul. 24, 2013

(86) PCT No.: PCT/EP2013/065662
§ 371 (c)(1),
(2) Date: Jan. 14, 2016

(87) PCT Pub. No.: WO2015/010739
PCT Pub. Date: Jan. 29, 2015

(65) Prior Publication Data
US 2016/0159080 A1  Jun. 9, 2016

(51) Int. Cl.
*B41F 31/02* (2006.01)
*G03G 15/10* (2006.01)
*G01F 23/22* (2006.01)
*G01N 11/14* (2006.01)

(52) U.S. Cl.
CPC .......... *B41F 31/022* (2013.01); *G01F 23/226* (2013.01); *G01N 11/14* (2013.01); *G03G 15/104* (2013.01)

(58) Field of Classification Search
USPC ...................................................... 73/54.02
See application file for complete search history.

(56) References Cited

U.S. PATENT DOCUMENTS

| 4,002,891 A | * | 1/1977 | Porter | B01F 15/00201 366/601 |
| 5,039,603 A | * | 8/1991 | Pocius | G09B 19/02 434/188 |
| 6,546,866 B1 | | 4/2003 | Adachi et al. | |
| 7,331,703 B1 | | 2/2008 | Hahn et al. | |
| 7,729,626 B2 | | 6/2010 | Kamoda et al. | |
| 2005/0087002 A1 | * | 4/2005 | Kanzaki | B01F 13/0827 73/54.28 |

(Continued)

FOREIGN PATENT DOCUMENTS

| EP | 1550868 A1 | 7/2005 |
| GB | 2180773 A | 4/1987 |

(Continued)

OTHER PUBLICATIONS

"Sensing Viscosity Change by Measuring Power", Mar. 16, 2010, https://www.google.com/url?sa=t&rct=j&q=&esrc=s&source=web &cd=1&ved=0CEcQFjAA&url=http%3A%2F%2Fwww.loadcontrols. com%2Fdownloads%2Fsensing_viscosity.pdf&ei=5Hx_ UdSBL8ftrAevk4GAAw&usg= AFQjCNEkYcmBfTmL130BGbonq4crVbU-8A&sig2=FW_ ijY2Dh7h50rJqbNxymQ&bvm=bv.45921128,d.bmk.

*Primary Examiner* — Nimeshkumar D Patel
*Assistant Examiner* — Jean F Morello
(74) *Attorney, Agent, or Firm* — Fabian VanCott

(57) ABSTRACT

A method to determine a quantity of a liquid in a container. In the method, a actuator is controlled to rotate a member in the container at a first speed. A measurement of electrical current drawn by the actuator at the first speed is received. A quantity of liquid in the container is determined through a look-up table and the measured electrical current.

14 Claims, 6 Drawing Sheets

(56) References Cited

U.S. PATENT DOCUMENTS

| | | | |
|---|---|---|---|
| 2007/0070130 A1 | 3/2007 | Widman et al. | |
| 2008/0112719 A1* | 5/2008 | Oda | G03G 15/104 399/57 |
| 2011/0031922 A1* | 2/2011 | Sakai | H02P 23/22 318/519 |
| 2012/0312049 A1* | 12/2012 | Downs, III | A23G 9/20 62/340 |

FOREIGN PATENT DOCUMENTS

| | | | |
|---|---|---|---|
| JP | 2008009071 | 1/2008 | |
| WO | WO 2013164587 A1 * | 11/2013 | G01N 11/04 |

\* cited by examiner

TO DETERMINE A QUANTITY OF A LIQUID IN A CHAMBER

BACKGROUND

Printing apparatus are usually arranged to deposit a printing liquid on a sheet or roll of media to form text and/or graphics thereon. The printing liquid may include at least two components such as a first liquid having a first viscosity and a second liquid having a second different viscosity. Alternatively, the printing liquid may include a liquid and a solid.

BRIEF DESCRIPTION

Reference will now be made by way of example only to the accompanying drawings in which.

DETAILED DESCRIPTION

Figure 1:
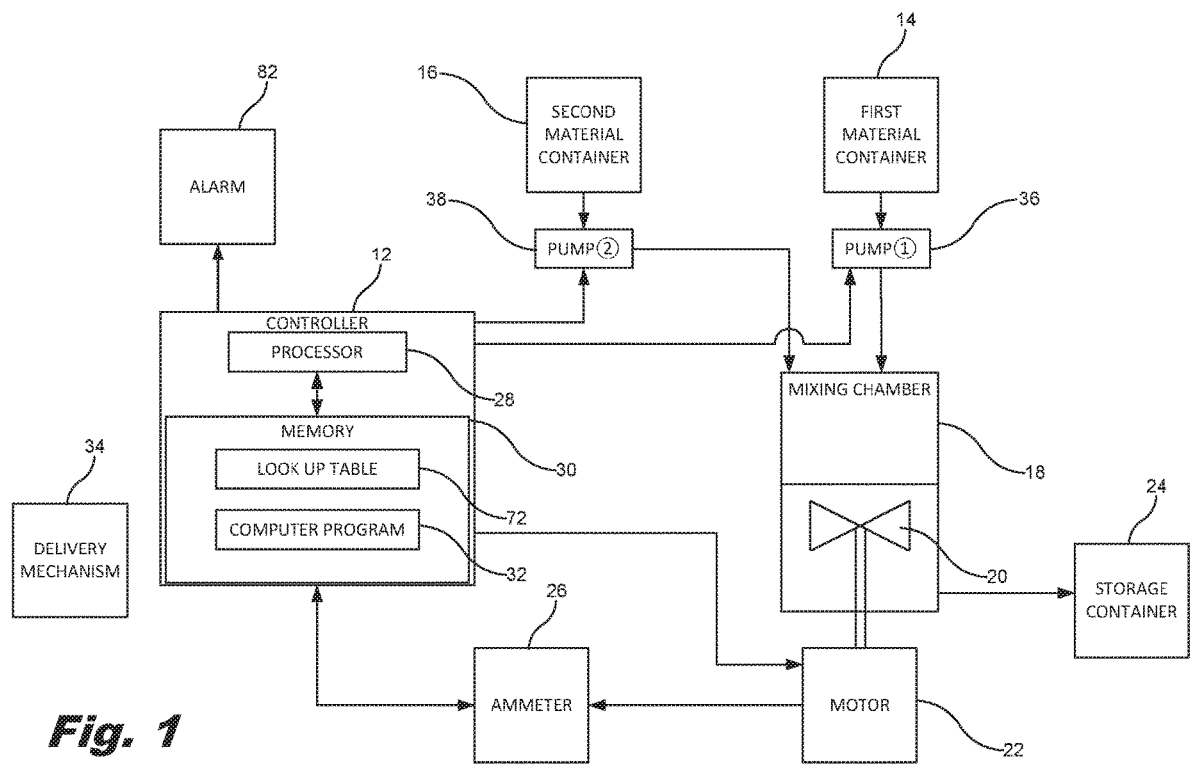
FIG. 1 illustrates a schematic diagram of an apparatus according to an example.

FIG. 1 illustrates a schematic diagram of an apparatus 10 that is arranged to mix at least two components of a liquid. For example, the apparatus 10 may be arranged to mix at least two components of a printing liquid such as ink. The apparatus 10 includes a controller 12, a first material container 14, a second material container 16, a mixing chamber 18, a mixer 20, a motor 22, a container 24, an ammeter 26, and an alarm 82.

In some examples, the apparatus 10 is a printing system that additionally includes components for applying the liquid to media. In other examples, the apparatus 10 may be a dedicated system for mixing or stirring liquid and does not include printing components.

In some examples, the apparatus 10 is a module. As used here, 'module' refers to a unit or apparatus that excludes certain parts/components that would be added by an end manufacturer or a user. For example, where the apparatus 10 is a module, the module 10 may only include the controller 12 and the other components illustrated in FIG. 1 may be added by an end manufacturer.

The implementation of the controller 12 can be in hardware alone (for example, circuitry, a processor and so on), have certain aspects in software including firmware alone or can be a combination of hardware and software (including firmware).

The controller 12 may be implemented using instructions that enable hardware functionality, for example, by using executable computer program instructions in a general-purpose or special-purpose processor that may be stored on a computer readable storage medium (disk, memory etc) to be executed by such a processor. Consequently, in some examples, the controller 12 includes at least one processor 28 and at least one memory 30.

The processor 28 is configured to read from and write to the memory 30. The processor 28 may also comprise an output interface via which data and/or commands are output by the processor and an input interface via which data and/or commands are input to the processor.

The memory 30 stores a computer program 32 comprising computer program instructions that control the operation of the apparatus 10 when loaded into the processor 28. The computer program instructions provide the logic and routines that enables the apparatus 10 to perform the methods illustrated in FIGS. 5 and 6. The processor 28 by reading the memory 30 is able to load and execute the computer program 32.

The computer program 32 may arrive at the apparatus 10 via any suitable delivery mechanism 34. The delivery mechanism 34 may be, for example, a non-transitory computer-readable storage medium, a computer program product, a memory device, a record medium such as a compact disc read-only memory (CD-ROM) or digital versatile disc (DVD), an article of manufacture that tangibly embodies the computer program 32. The delivery mechanism 34 may be a signal configured to reliably transfer the computer program 32. The apparatus 10 may propagate or transmit the computer program 32 as a computer data signal.

Although the memory 30 is illustrated as a single component it may be implemented as one or more separate components some or all of which may be integrated/removable and/or may provide permanent/semi-permanent/dynamic/cached storage.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

As used in this application, the term 'circuitry' refers to all of the following:

(a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware.

The first material container 14 is arranged to contain a first liquid component of the final mixed liquid. The first material container 14 is coupled to the mixing chamber 18 via a first pump 36 that is arranged to pump the first liquid component from the first material container 14 to the mixing chamber 18. The operation of the first pump 36 may be controlled by the controller 12. In other examples, the apparatus 10 may not include the first pump 36 and instead, the apparatus 10 is arranged so that the first liquid component may be provided to the mixing chamber 18 through gravity. The first liquid component has a first viscosity.

The second material container 16 is arranged to contain a second component of the final mixed liquid which may be a liquid (such as oil) or a solid (such as solid ink particles). The second material container 16 is coupled to the mixing chamber 18 via a second pump 36 that is arranged to pump the second component from the second material container 16 to the mixing chamber 18. The controller 12 may be arranged to control the operation of the second pump 38. In other examples, the apparatus 10 may not include the second pump 38 and instead, the apparatus 10 is arranged so that the second component may be provided to the mixing chamber 18 through gravity. The second component has a second viscosity, different to the first viscosity of the first liquid component.

The mixing chamber 18 may be any suitable container or chamber for receiving at least the first and second components from the first and second material containers 14, 16 respectively. The mixing chamber 18 is coupled to the container 24 to enable mixed liquid to be provided to, and stored in, the container 24. In some examples, the mixing chamber 18 does not include any sensors to determine the quantity and/or the viscosity of a liquid in the mixing chamber 18.

The mixer 20 may be any suitable member for mixing the first and second components of the liquid together. In some examples, the mixer 20 is arranged to rotate about an axis in order to mix the first and second components together. In other examples, the mixer 20 may move linearly (that is, in a straight line) within the mixing chamber 18 to mix the first and second components of the liquid together.

The motor 22 may be any suitable actuator for moving the mixer 20 within the mixing chamber 18. For example, where the mixer 20 is a rotary mixer, the motor 22 is arranged to rotate the mixer 20 about its axis. Where the mixer 20 is arranged to move linearly, the motor 22 is arranged to move the mixer 20 back and forth in a straight line.

The controller 12 is arranged to control the operation of the motor 22 and in particular, the speed at which the motor 22 moves the mixer 20 within the mixing chamber 18. For example, where the mixer 20 is a rotary mixer, the controller 12 is arranged to control the motor 22 to rotate the mixer 20 at a plurality of different speeds.

The container 24 may be any suitable container (such as an ink tank) for receiving the mixed liquid from the mixing chamber 18. In some examples, the apparatus 10 may include a pump (not illustrated) for pumping the mixed liquid from the mixing chamber 18 to the container 24. In other examples, the mixed liquid may be provided to the container 24 via gravity.

The ammeter 26 may be any suitable device for measuring the electrical current drawn by the motor 22. The controller 12 is arranged to receive the measured electrical current from the ammeter 26. In some examples, the ammeter 26 may continuously or periodically measure the electrical current drawn by the motor 22. In other examples, the controller 12 may request the ammeter 26 to measure the electrical current drawn by the motor 22 and in response, the ammeter 26 measures the current drawn by the motor 22 and provides the measurement to the controller 12.

The electrical current drawn by the motor 22 is proportional to the load on the mixer 20. The load on the mixer 20 increases with increased viscosity of the liquid within the mixing chamber 18. The load on the mixer 20 also increases with increased quantity of the liquid within the mixing chamber 18. Furthermore, the load on the mixer 20 also increases with increased speed of movement of the mixer 20.

Figure 2:
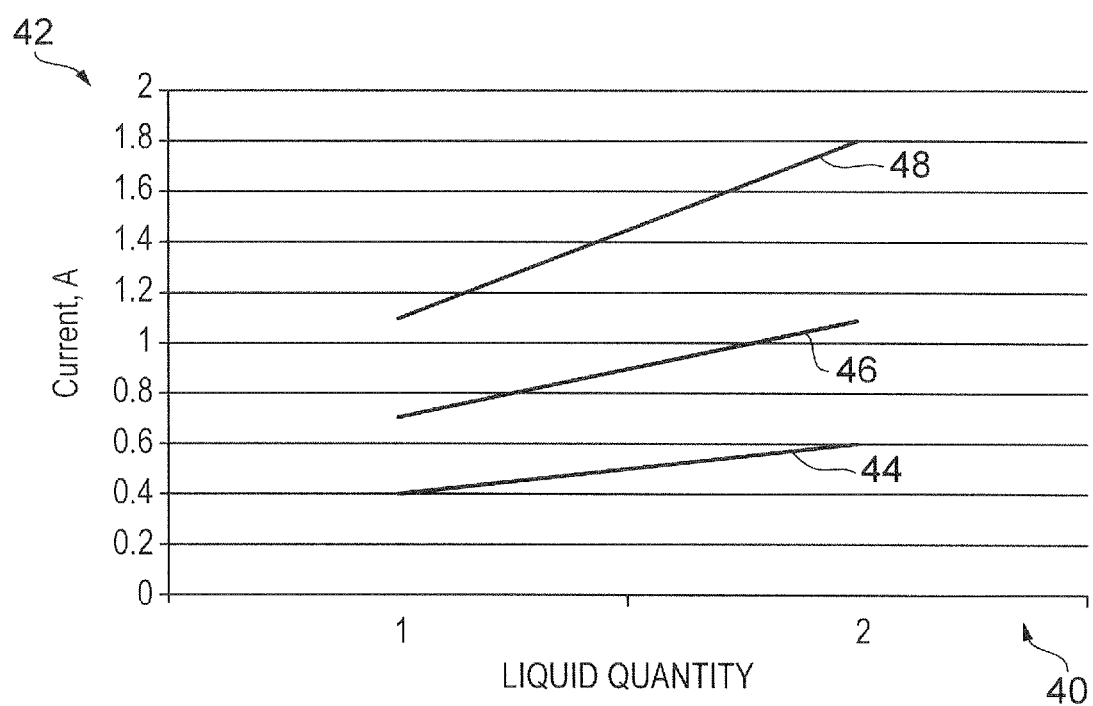
FIG. 2 illustrates a graph of electrical current as a function of liquid quantity for different mixer speeds at a constant liquid density.

FIG. 2 illustrates a graph of electrical current drawn by the motor 22 as a function of the quantity of liquid within the mixing chamber 18 according to an example. The density (and hence viscosity) of the liquid is a constant for FIG. 2. The graph includes an X axis 40 for quantity of liquid within the mixing chamber 18, and a Y axis 42 for the electrical current drawn by the motor 22 (in amperes).

The graph also includes: a first line 44 that represents how the electrical current drawn varies with the quantity of liquid when the mixer 20 is rotated at 500 revolutions per minute (RPM); a second line 46 that represents how the electrical current drawn varies with the quantity of liquid when the mixer 20 is rotated at 1000 RPM; and a third line 48 that represents how the electrical current drawn varies with the quantity of liquid when the mixer 20 is rotated at 1500 RPM.

The first line 44 has an electrical current value of 0.4 at a liquid quantity of 1, an electrical current value of 0.6 at a liquid quantity of 2 and a relatively low constant gradient there between. The second line 46 has an electrical current value of 0.7 at a liquid quantity of 1, an electrical current value of 1.1 at a liquid quantity of 2, and a constant gradient (greater than the gradient of the first line 44) there between. The third line 48 has an electrical current value of 1.1 at a liquid quantity of 1, an electrical current value of 1.8 at a liquid quantity of 2, and a constant gradient (greater than the gradient of the second line 46) there between.

In this example, the lines 44, 46, 48 were obtained through testing. In other examples, the lines 44, 46, 48 may be obtained through calculation.

Figure 3:
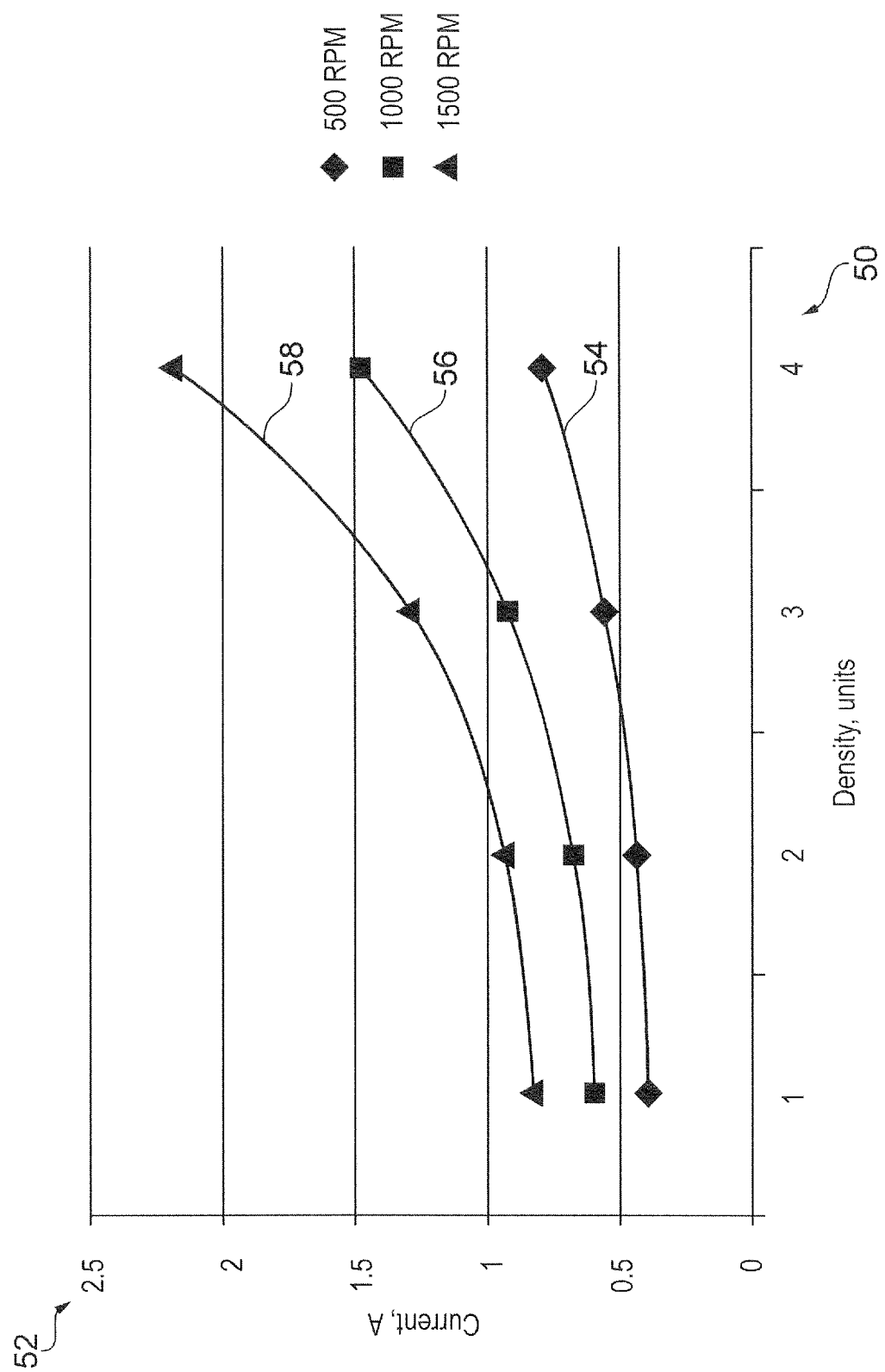
FIG. 3 illustrates a graph of electrical current as a function of liquid density for different mixer speeds at a constant quantity of liquid.

FIG. 3 illustrates a graph of electrical current drawn by the motor 22 as a function of liquid density (and hence liquid viscosity) according to an example. The quantity of liquid within the mixing chamber 18 is a constant for FIG. 3. The graph includes an X axis 50 for density of the liquid in the mixing chamber 18, and a Y axis 52 for the electrical current drawn by the motor 22 (in amperes).

The graph also includes: a first line 54 that represents how the electrical current drawn varies with the density of liquid when the mixer 20 is rotated at 500 revolutions per minute (RPM); a second line 56 that represents how the electrical current drawn varies with the density of liquid when the mixer 20 is rotated at 1000 RPM; and a third line 58 that represents how the electrical current drawn varies with the density of liquid when the mixer 20 is rotated at 1500 RPM.

The first line 54, the second line 56 and the third line 58 have a curved shape and increase exponentially with increased density of the liquid within the mixing chamber 18. The first line 54 has an electrical current value of 0.4 at a liquid density of 1, rising to an electrical current value of 0.8 at a liquid density of 4. The second line 56 has an electrical current value of 0.6 at a liquid density of 1, rising to an electrical current value of 1.5 at a liquid density of 4. The third line 58 has an electrical current value of 0.9 at a liquid density of 1, rising to an electrical current value of 2.2 at a liquid density of 4.

In this example, the lines 54, 56, 58 were obtained through testing. In other examples, the lines 54, 56, 58 may be obtained through calculation.

Figure 4:
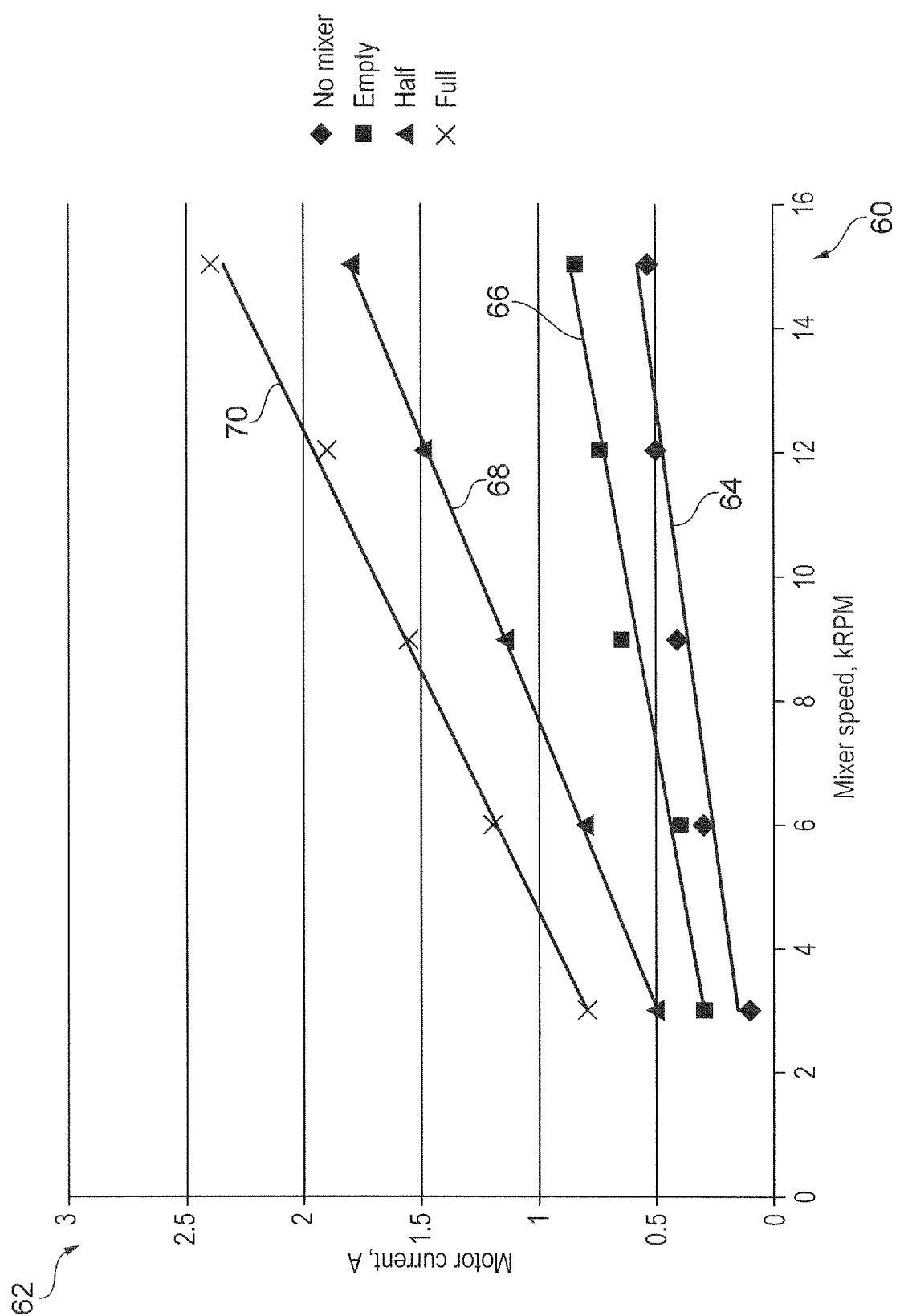
FIG. 4 illustrates a graph of electrical current as a function of mixer speed for different quantities of liquid.

FIG. 4 illustrates a graph of electrical current drawn by the motor 22 as a function of the speed of the mixer 20 for different quantities of liquid according to an example. The graph includes an X axis 60 for the speed of the mixer 20 in the mixing chamber 18, and a Y axis 62 for the electrical current drawn by the motor 22 (in amperes).

The graph also includes: a first line 64 that represents how the electrical current drawn varies with the mixer speed when the mixer 20 is not present in the mixing chamber 18 (that is, the motor 22 is not coupled to the mixer 20, but still operates under the control of the controller 12); a second line 66 that represents how the electrical current drawn varies with the mixer speed when the mixing chamber is empty (that is, there is no liquid within the mixing chamber 18); a third line 68 that represents how the electrical current drawn varies with the mixer speed when the mixing chamber 18 is half full (that is, liquid occupies half of the volume of the mixing chamber 18; and a fourth line 70 that represents how the electrical current drawn by the motor 22 varies with the mixer speed when the mixing chamber 18 is full (that is, the liquid occupies the whole volume of the mixing chamber 18).

The first line 64, the second line 66, the third line 68 and the fourth line 70 are straight (that is, they have constant gradients). The first line 64 has an electrical current value of 0.1 at a mixer speed of 3000 RPM, rising to an electrical current value of 0.6 at a mixer speed of 15000 RPM. The second line 66 has an electrical current value of 0.3 at a mixer speed of 3000 RPM, rising to an electrical current value of 0.9 at a mixer speed of 15000 RPM. The gradient of the second line 66 is greater than the gradient of the first line 64. The third line 68 has an electrical current value of 0.5 at a mixer speed of 3000 RPM, rising to an electrical current value of 1.8 at a mixer speed of 15000 RPM. The gradient of the third line 68 is greater than the gradient of the second line 66. The fourth line 70 has an electrical current value of 0.8 at a mixer speed of 3000 RPM, rising to an electrical current value of 2.4 at a mixer speed of 15000 RPM. The gradient of the fourth line 70 is greater than the gradient of the third line 68.

In this example, the lines 64, 66, 68, 70 were obtained through testing. In other examples, the lines 64, 66, 68, 70 may be obtained through calculation.

Returning to FIG. 1, the memory 30 also stores at least one look-up table 72 that includes data relating to how the electrical current drawn by the motor 22 is associated with the speed of the mixer 20, the density of the liquid in the mixing chamber 18, and the quantity of the liquid within the mixing chamber 18 (as illustrated in FIGS. 2, 3 and 4 for example).

The controller 12 is arranged to use the look-up table 72 to determine the quantity of liquid within the mixing chamber 18 where the viscosity of the liquid and the mixer speed are known and the electrical current drawn from the motor 22 has been received at the controller 12. For example, and with reference to FIG. 4, where the viscosity of the liquid is known and the mixer speed is 12,000 RPM and where the measured electrical current is 1.5 A, the controller 12 may use the look-up table 72 to determine that the mixing chamber 18 is half full.

The controller 12 is also arranged to use the look-up table 72 to determine the viscosity of the liquid within the mixing chamber 18 where the quantity of the liquid and the mixer speed are known and the electrical current drawn from the motor 22 has been received at the controller 12.

Additionally, the controller 12 is arranged to use the look-up table 72 to determine the viscosity of liquid and the quantity of liquid within the mixing chamber 18 using at least two mixer speeds of the mixer 20 within the mixing chamber 18 (the two electrical current measurements may be considered to form simultaneous equations that enable the viscosity and quantity to be determined).

Figure 5:
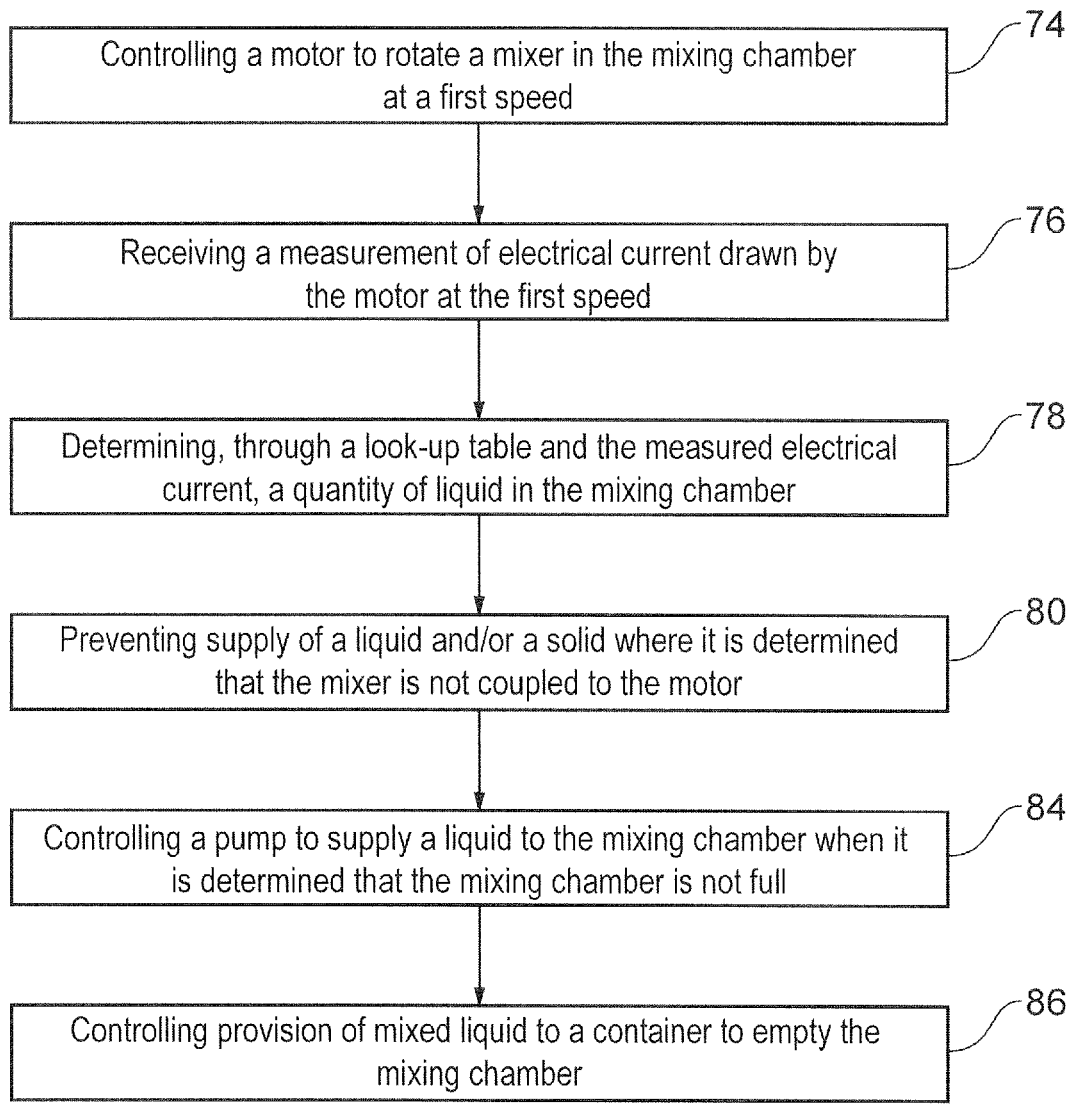
FIG. 5 illustrates a flow diagram of a method to determine a quantity of a liquid in a mixing chamber according to an example.

FIG. 5 illustrates a flow diagram of a method to determine a quantity of a liquid in the mixing chamber 18 according to an example. At block 74, the controller 12 controls the motor 22 to rotate the mixer 20 in the mixing chamber 18 at a first speed.

At block 76, the controller 12 receives a measurement of electrical current drawn by the motor 22 while the motor is rotating the mixer 20 at the first speed.

At block 78, the controller 12 determines, using the look-up table 72 and the measured electrical current received at block 74, a quantity of liquid in the mixing chamber. The controller 12 may control a display or an audio output device to provide an output that informs a user of the apparatus 10 of the status of the mixing chamber 18 (that is, the output includes the quantity of liquid that is present within the mixing chamber 18). The subsequent operation of the controller 12 depends upon the determination made at block 78.

Where the controller 12 determines that the mixer 20 is not coupled to the motor 22, the method moves to block 80 and the controller 12 controls the first pump 36 and the second pump 38 to stop pumping and thereby prevent the supply of the first and second components of the liquid to the mixing chamber 18. For example, with reference to FIG. 4, where the mixer 20 is rotated at a speed of 12,000 RPM and the controller 12 receives a measured electrical current of 0.5 A, the controller 12 determines that the mixer 20 is not coupled to the motor 22 and may then automatically control the first and second pumps 36, 38 as described above. Additionally, the controller 12 may control an alarm 82 to alert a user to the fact that the mixer 20 is not coupled to the motor 22. For example, the alarm 82 may include an audio device that provides acoustic waves (such as a siren sound) to the user to alert them, and additionally or alternatively include a visual device (such as a display) that alerts the user and may provide instructions to the user to inform as to how the mixer 20 may be positioned within the mixing chamber 18 and coupled to the motor 22.

Where the controller 12 determines that the mixing chamber 18 is not full of liquid, the method moves to block 84 and the controller 12 controls the first pump 36 and/or the second pump 38 to pump the first component and/or the second component of the liquid to the mixing chamber 18. For example, where the controller 12 controls the motor 22 to rotate the mixer 20 at 12,000 RPM and receives a measured electrical current between 0.75 A and 1.9 A, the controller 12 determines that the mixing chamber 18 is not full and controls the first and second pumps 36, 38 to fill the mixing chamber 18.

Where the controller 12 determines that the mixing chamber 18 is full of liquid, the method moves to block 86 and the controller 12 controls the provision of the mixed liquid to the container 24 to empty the mixing chamber 18. For example, where the controller 12 controls the motor 22 to rotate the mixer 20 at 12,000 RPM and receives a measured electrical current of 1.9 A, the controller 12 determines that the mixing chamber 18 is full and controls a pump (for example) to pump the mixed liquid from the mixing chamber 18 to the container 24. In some examples, the controller 12 may control the motor 22 to rotate the mixer 20 for a predetermined period of time before supplying the mixed liquid to the container 24 to ensure that the liquid is sufficiently mixed.

The apparatus 10 may provide several advantages and these are described in the following paragraphs.

Firstly, the apparatus 10 does not require a load cell to measure the quantity of liquid within the mixing chamber 18. Furthermore, the apparatus 10 does not require any sensors within the mixing chamber 18 to determine the quantity of liquid within the mixing chamber 18. Consequently, the apparatus 10 may be relatively simple and more reliable when compared to existing mixing apparatus.

Secondly, the apparatus 10 is able to determine the quantity of liquid within the mixing chamber 18 without requiring the replacement of the contents of the mixing chamber 18. Consequently, the apparatus 10 may be operable relatively quickly after a software reset and may not require any liquid in the mixing chamber 18 to be wasted.

Thirdly, the apparatus 10 is able to determine that the mixing chamber 18 is empty relatively quickly when compared to an apparatus that comprises a load cell whereby a pump is activated to empty the mixing chamber 18 and the change in weight is monitored.

Fourthly, the apparatus 10 is arranged to determine when the mixer 20 is not coupled to the motor 22 and may advantageously prevent the supply of liquid components to the mixing chamber 18 and may also advantageously provide instructions to the user to enable them to couple the mixer 20 to the motor 22.

Figure 6:
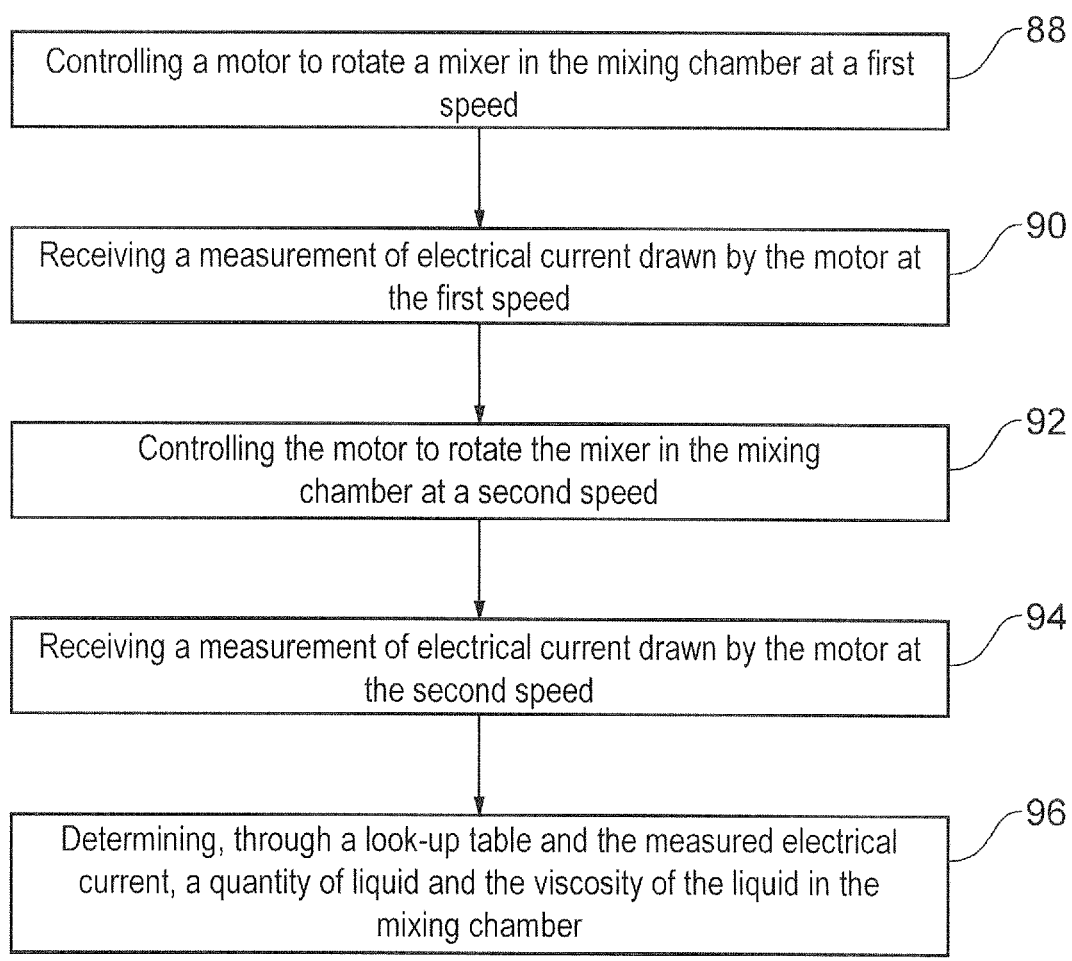
FIG. 6 illustrates a flow diagram of a method to determine a quantity and a viscosity of a liquid in a mixing chamber according to an example.

FIG. 6 illustrates a flow diagram of a method to determine a quantity and a viscosity of a liquid in the mixing chamber 18 according to an example.

At block 88, the controller 12 controls the motor 22 to rotate the mixer 20 in the mixing chamber 18 at a first speed.

At block 90, the controller 12 receives a measurement of electrical current drawn by the motor 22 while the motor is rotating the mixer 20 at the first speed.

At block 92, the controller 12 controls the motor 22 to rotate the mixer 20 in the mixing chamber 18 at a second speed, different to the first speed.

At block 94, the controller 12 receives a measurement of electrical current drawn by the motor 22 while the motor is rotating the mixer 20 at the second speed.

At block 96, the controller 12 determines, using the look-up table 72 and the measured electrical current received at blocks 90 and 94, a quantity of liquid in the mixing chamber 18 and the viscosity of that liquid. The controller 12 may control a display or an audio output device to provide an output that informs a user of the apparatus 10 of the status of the liquid in the mixing chamber 18 (that is, the output includes the quantity of liquid that is present within the mixing chamber 18 and the viscosity of that liquid). The subsequent operation of the controller 12 may include any of blocks 80, 84 and 86 illustrated in FIG. 5.

In some examples, the controller 12 may control the motor 22 to rotate the mixer 20 at more than two different speeds in order to receive more than electrical current measurements. This may advantageously increase the accuracy of the determined quantity and viscosity of the liquid within the mixing chamber 18.

The blocks illustrated in the FIGS. 5 and 6 may represent steps in a method and/or sections of code in the computer program 32. The illustration of a particular order to the blocks does not necessarily imply that there is a required or preferred order for the blocks and the order and arrangement of the block may be varied. Furthermore, it may be possible for some blocks to be omitted.

Although examples of the present invention have been described in the preceding paragraphs, it should be appreciated that modifications to the examples given can be made without departing from the scope of the invention as claimed. For example, the apparatus 10 may be used to determine the quantity and the viscosity of any liquid (that is, the liquid is not limited to ink).

In some examples, the apparatus 10 may not be arranged to mix at least two components of a liquid, but instead be arranged to stir a single liquid. In these examples, the apparatus 10 is arranged to receive a liquid within the container 18 (which may or may not include at least two pre-mixed components) and the member 20 is arranged to stir the liquid. While the member 20 is stirring the liquid, the controller 12 may determine the quantity and viscosity of the liquid as described in the preceding paragraphs. In these examples, the member 20 may be referred to as a stirrer.

Features described in the preceding description may be used in combinations other than the combinations explicitly described.

Although functions have been described with reference to certain features, those functions may be performable by other features whether described or not.

Although features have been described with reference to certain examples, those features may also be present in other examples whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

We claim:

1. A method to determine a quantity of a liquid in a chamber, the method comprising:
controlling a motor to rotate a mixer in the chamber at a first speed;
receiving a measurement of electrical current drawn by the motor at the first speed;
determining a quantity of liquid in the chamber by referring to a look-up table, the look-up table comprising correlations between the electrical current drawn by the motor, the speed of the mixer, the density of the liquid in the chamber, and the quantity of the liquid within the mixing chamber, wherein the liquid in the chamber comprises a first liquid and a second liquid, the motor causing the mixer to mix the first liquid and the second liquid; and
supplying the mixed first liquid and second liquid to at least one component for applying the mixed liquid to media;
wherein determining a quality of liquid in the chamber comprises determining the viscosity of the liquid comprising:
controlling the motor to rotate the mixer in the chamber at a second speed;
receiving a measurement of electrical current drawn by the motor at the second speed; and
determining, based on the look-up table and the measured electrical current, the quantity of liquid and a viscosity of the liquid in the chamber.

2. The method of claim 1, comprising providing instructions to a user to couple the mixer to the motor.

3. A non-transitory computer-readable storage medium encoded with instructions that, when performed by a processor, cause performance of:
- controlling a motor to rotate a mixer in a chamber at a first speed;
- receiving a measurement of electrical current drawn by the motor at the first speed; and
- determining a quantity of liquid in the chamber by referring to a look-up table, the look-up table comprising correlations between the electrical current drawn by the motor, the speed of the mixer, the density of the liquid in the chamber, and the quantity of the liquid within the mixing chamber, wherein the liquid in the chamber comprises a first liquid and a second liquid, the motor causing the mixer to mix the first liquid and the second liquid and wherein the first liquid and the second liquid are two components of a printing fluid;
- determining, through the look-up table and the measured electrical current, that the mixer is not coupled to the motor;
- preventing supply of a material where it is determined that the mixer is not coupled to the motor; and
- supplying the mixed first liquid and second liquid to at least one printing component for applying the mixed liquid to media.

4. The non-transitory computer-readable storage medium of claim 3,
- wherein the storage medium is portable and separate from the processor; and
- wherein the processor further comprises an input interface via which the storage medium can be inserted to provide the processor with the encoded instructions.

5. The computer-readable storage medium of claim 3, wherein the instructions, when performed by a processor, further cause the performance of determining, through a look-up table, a known quantity of liquid, and the measured electrical current, a viscosity of liquid in the chamber.

6. The computer-readable storage medium of claim 3, wherein the look-up table comprises:
- a first data set that relates the viscosity of a liquid, the measured electrical current and the mixer speed to a quantity of liquid in the chamber; and
- a second data set that relates the quantity of a liquid, the measured electrical current and the mixer speed to a viscosity of liquid in the chamber.

7. The non-transitory computer-readable storage medium of claim 3, comprising instructions encoded thereon that, when performed by a processor, cause performance of controlling an alarm to alert a user where it is determined that the mixer is not coupled to the motor.

8. An apparatus to determine a property of a liquid in a container, the apparatus comprising:
- a controller; and
- a motor communicatively coupled to the controller;
- wherein the controller is configured to:
  - control the motor to move a mixing arm in the container at a first speed;
  - receive a first measurement of electrical current drawn by the motor at the first speed;
  - control the motor to move the mixing arm in the container at a second speed different from the first speed;
  - receive a second measurement of the electrical current drawn by the motor at the second speed;
  - determine a property of liquid in the chamber by referring to a look-up table, the look-up table comprising correlations between the electrical current drawn by the motor, the speed of the mixer, the density of the liquid in the chamber, and the quantity of the liquid within the mixing chamber and the first and second measured electrical currents, wherein the liquid in the chamber comprises a first liquid and a second liquid, the motor causing the mixer to mix the first liquid and the second liquid;
  - determine, through the look-up table and the measured electrical current, whether the mixer is coupled to the motor;
  - prevent supply of a material in response to a determination that the mixer is not coupled to the motor; and
  - supplying the mixed first liquid and second liquid to at least one component for applying the mixed liquid to media.

9. The apparatus of claim 8, wherein the apparatus does not comprise a load cell to weigh the container.

10. The apparatus of claim 8, wherein the apparatus does not comprise sensors within the container to determine the quantity and/or the viscosity of liquid in the container.

11. The apparatus of claim 8, further comprising an ammeter to measure the electrical current drawn by the actuator and to provide the measured electrical current to the controller.

12. The apparatus of claim 8, wherein the controller is configured to determine, through a look-up table and the measured electrical current, at least two properties of the liquid, including a quantity and a viscosity of the liquid.

13. The apparatus of claim 8, wherein the controller is further configured to control a display or an audio output device to provide an output that informs a user of the status of the mixing chamber in terms of viscosity, quantity or a combination thereof.

14. The apparatus of claim 8, wherein the controller controls an alarm to alert a user where it is determined that the mixer is not coupled to the motor.

* * * * *